(12) United States Patent
Kim

(10) Patent No.: US 8,626,010 B2
(45) Date of Patent: *Jan. 7, 2014

(54) ELECTRIC POWER RELAYING UNIT AND IMAGE FORMING APPARATUS HAVING THE SAME

(71) Applicant: Samsung Electronics Co., Ltd., Suwon-si (KR)

(72) Inventor: Jin-ha Kim, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/718,383

(22) Filed: Dec. 18, 2012

(65) Prior Publication Data

US 2013/0108305 A1    May 2, 2013

Related U.S. Application Data

(63) Continuation of application No. 12/801,549, filed on Jun. 14, 2010, now Pat. No. 8,358,943.

(30) Foreign Application Priority Data

Oct. 12, 2009  (KR) .................. 10-2009-0096810

(51) Int. Cl.
*G03G 15/00* (2006.01)
(52) U.S. Cl.
USPC .................................. 399/37; 363/74; 363/78
(58) Field of Classification Search
USPC ................................................ 399/37, 74, 78
See application file for complete search history.

(56) References Cited

U.S. PATENT DOCUMENTS

| 4,926,862 | A  * | 5/1990  | Miyajima et al. | ............. 607/142 |
| 8,259,422 | B2 * | 9/2012  | Naito et al. | ...................... 361/18 |
| 8,358,943 | B2 * | 1/2013  | Kim | ............................... 399/37 |
| 2008/0238383 | A1 * | 10/2008 | Watanabe et al. | ............. 323/271 |

FOREIGN PATENT DOCUMENTS

| JP | 10-125423 | 5/1998 |
| KR | 2003-0060343 | 7/2003 |

OTHER PUBLICATIONS

Tsuchida, Eiji, English Abstract, JP 2008172962 A, Jul. 2008.
Tsuchida, Eiji, English Translation, JP 2008172962 A, Jul. 2008.
U.S. Office Action mailed May 29, 2012 in copending U.S. Appl. No. 12/801,549.
U.S. Notice of Allowance mailed Sep. 28, 2012 in copending U.S. Appl. No. 12/801,549.
U.S. Appl. No. 12/801,549, filed Jun. 14, 2010, Jin Ha Kim, Samsung Electronics Co., Ltd.

* cited by examiner

*Primary Examiner* — Ryan Walsh
(74) *Attorney, Agent, or Firm* — Staas & Halsey LLP

(57) ABSTRACT

An electric power relaying unit of an image forming apparatus which includes an electric power blocking unit which selectively blocks the alternating current electric power output from the electric power input unit to be input to the electric power output unit, the electric power blocking unit including: a switching unit which switches an input of the alternating current electric power with respect to the electric power output unit; an electric power detecting unit which detects an electric power property; a memory unit in which a predetermined electric power property information is stored; and a control unit which controls a switching operation of the switching unit if determining that the detected electric power property corresponds to a predetermined electric power property in a failure of the image forming apparatus main body from a comparison result.

11 Claims, 10 Drawing Sheets

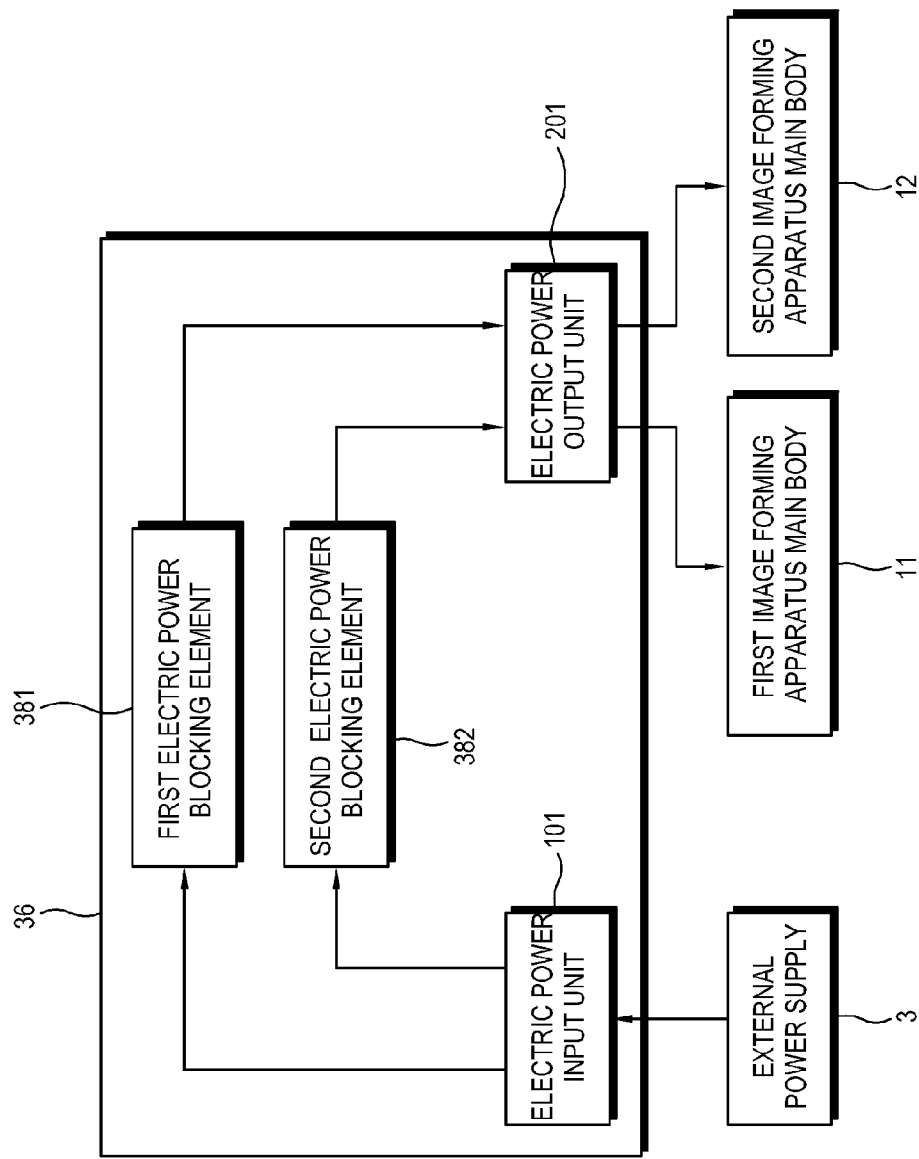

ELECTRIC POWER RELAYING UNIT AND IMAGE FORMING APPARATUS HAVING THE SAME

CROSS-REFERENCE TO RELATED APPLICATIONS

This application is a continuation of U.S. application Ser. No. 12/801,549, filed on Jun. 14, 2010, which claims priority from Korean Patent Application No. 10-2009-0096810, filed on Oct. 12, 2009 in the Korean Intellectual Property Office, the disclosures of which are incorporated herein by reference.

BACKGROUND

1. Field

Apparatuses consistent with the present embodiments relate to an electric power relaying unit connected to an external power supply and an image forming apparatus having the same, and more particularly, to an electric power relaying unit corresponding to the case that an alternating current power supplied from an external power supply shows a failure electric power property and an image forming apparatus having the same.

2. Description of the Related Art

An image forming apparatus applies a developer, an ink, etc. to form an image on a printing medium based on an image data input from a host. To perform this function, the image forming apparatus receives an electric power from an external power supply.

The image forming apparatus is designed with a consideration of various using environments in manufacturing thereof, and is applied with a configuration design capable of protecting various elements in the apparatus to prepare the case that an electric power supplied from an external power supply shows an abnormal state such as an overcurrent.

However, since the image forming apparatus has been released to be used under various environments, a failure may happen due to a factor which fails to be expected in a designing operation. For example, an electric power supplied from an external power supply may have an abnormal property which was not considered in a designing operation. In this case, if a protecting configuration disposed in the image forming apparatus fails to block the electric power showing this property, this may be the cause of a failure or a fire of the image forming apparatus.

If this problem happens, conventionally, the image forming apparatus is collected from a user, and a configuration of the image forming apparatus is replaced or corrected to correspond to a failure electric power property of the problem to be then delivered to the user. That is, a recall preventing a failure or a fire of the image forming apparatus is performed.

However, in this method, it is difficult for a general user rather than a manufacturer to repair the image forming apparatus. Accordingly, since the image forming apparatus should be collected to a manufacturer, it is inconvenient for the user not to use the image forming apparatus during a recall period. Also, it is difficult for the manufacturer to collect and repair all image forming apparatus of the same model as the recall target.

SUMMARY

Accordingly, it is an aspect to provide an electric power relaying unit protecting an image forming apparatus from a failure electric power without the necessity that a manufacturer collects image forming apparatus when it is necessary to recall the image forming apparatus, and an image forming apparatus having the same.

The foregoing and/or other aspects can be achieved by providing an electric power relaying unit of an image forming apparatus which transmits an alternating current electric power output from an external power supply to an image forming apparatus main body, the electric power relaying unit of the image forming apparatus including: an electric power input unit which is connected to the external power supply, and receives an alternating current electric power from the external power supply; an electric power output unit which is connected to an electric power input terminal of the image forming apparatus main body, and outputs the input alternating current electric power to the image forming apparatus main body; and an electric power blocking unit which selectively blocks the alternating current electric power output from the electric power input unit to be input to the electric power output unit, the electric power blocking unit including: a switching unit which switches an input of the alternating current electric power with respect to the electric power output unit; an electric power detecting unit which detects an electric power property of the alternating current electric power; a memory unit in which a predetermined electric power property information is stored; and a control unit which compares an electric power property detected by the electric power detecting unit with an electric power property information stored in the memory unit, and controls a switching operation of the switching unit if determining that the detected electric power property corresponds to a predetermined electric power property in a failure of the image forming apparatus main body from a comparison result.

If the alternating current electric power corresponds to an abnormal electric power predetermined to correspond to an operating environment of the image forming apparatus main body, the control unit may determine that the alternating current electric power corresponds to an electric power property in a failure of the image forming apparatus main body.

The memory unit may store a profile of a predetermined abnormal electric power pattern, and if an electric power pattern detected by the electric power detecting unit corresponds to the profile of the abnormal electric power stored in the memory unit, the control unit may determine that the alternating current electric power corresponds to an electric power property in a failure of the image forming apparatus main body.

The electric power blocking unit may include an interface unit which is provided to be accessible to the memory unit from an outside so that the profile of the electric power pattern stored in the memory unit can be updated.

The interface unit may include at least one of a memory port to which an external memory is mounted, and a communication port allowing a local communication or a network communication.

The electric power blocking unit may include a display unit which displays that an output of the alternating current electric power is blocked by the switching unit.

The electric power output unit may be provided to allow a plurality of image forming apparatus main bodies to be connected thereto so that the plurality of image forming apparatus main bodies can respectively receive the alternating current electric power.

The alternating current electric power output from the switching unit may diverge to respectively corresponds to the plurality of image forming apparatus main bodies.

The electric power blocking unit may be disposed in plural to correspond to each alternating current electric power diverging to respectively corresponding to the plurality of image forming apparatus main bodies from the electric power input unit.

The electric power relaying unit may include a user input unit, wherein the switching unit may switch the alternating current electric power to correspond to an input command of the user input unit.

The electric power relaying unit may include a user input unit, wherein if a predetermined time is input through the user input unit, the control unit may control a switching operation of the switching unit to correspond to an elapse of the input time.

Another aspect may be achieved by providing an image forming apparatus, including: an image forming apparatus main body; and an electric power relaying unit which transmits an alternating current electric power output from an external power supply to the image forming apparatus main body.

Another aspect may be achieved by providing an electric power relaying unit which transmits an alternating current electric power output from an external power supply to an electronic device, the electric power relaying unit including: an electric power input unit which is connected to the external power supply, and receives an alternating current electric power from the external power supply; an electric power output unit which is connected to an electric power input terminal of the electronic device, and outputs the input alternating current electric power to the electronic device; and an electric power blocking unit which selectively blocks the alternating current electric power output from the electric power input unit to be input to the electric power output unit, the electric power blocking unit including: a switching unit which switches an input of the alternating current electric power with respect to the electric power output unit; an electric power detecting unit which detects an electric power property of the alternating current electric power; a memory unit in which a predetermined electric power property information is stored; and a control unit which compares an electric power property detected by the electric power detecting unit with an electric power property information stored in the memory unit, and controls a switching operation of the switching unit if determining that the detected electric power property corresponds to a predetermined electric power property in a failure of the electronic device from a comparison result.

Additional aspects and/or advantages will be set forth in part in the description which follows and, in part, will be apparent from the description, or may be learned by practice of the embodiments.

BRIEF DESCRIPTION OF THE DRAWINGS

The above and/or other aspects and advantages will become apparent and more readily appreciated from the following description of the embodiments, taken in conjunction with the accompanying drawings of which:

FIG. 10 is a block diagram illustrating an electric power transmitting and controlling configuration of an electric power relaying unit according to an exemplary embodiment.

DETAILED DESCRIPTION

Figure 1:
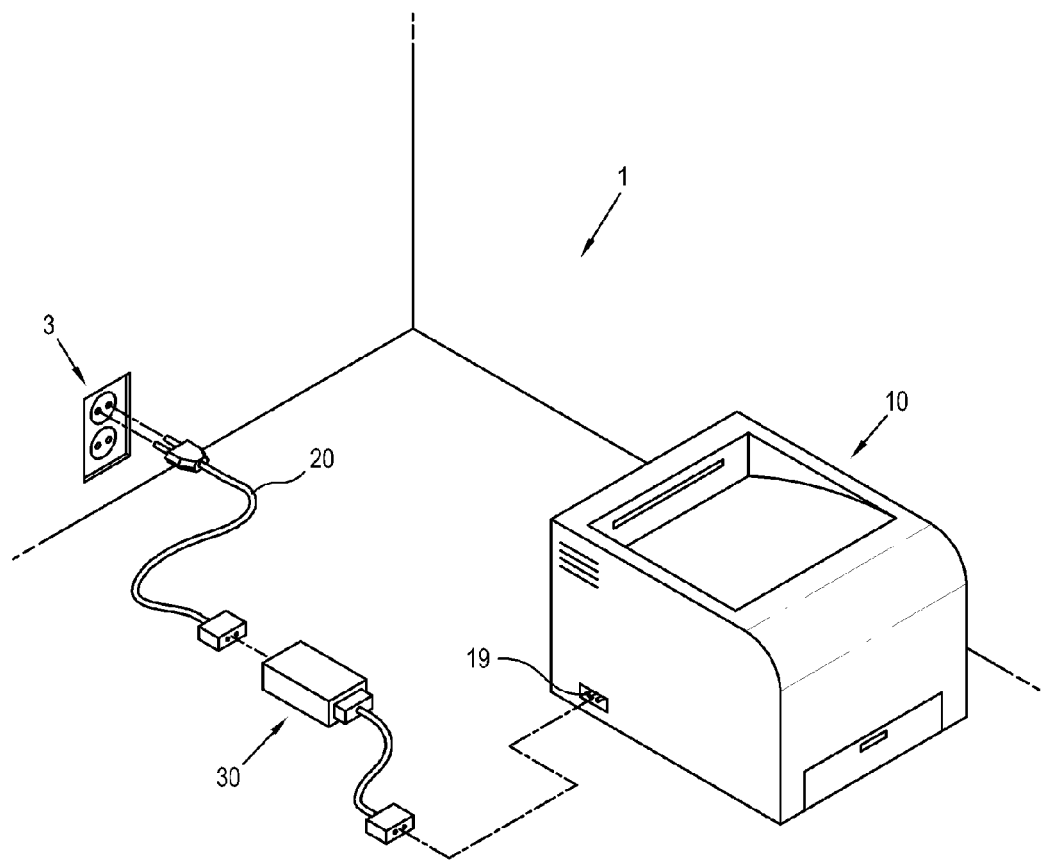
FIG. 1 exemplarily illustrates an image forming apparatus according to an exemplary embodiment.

Reference will now be made in detail to the embodiments, examples of which are illustrated in the accompanying drawings, wherein like reference numerals refer to like elements throughout. The exemplary embodiments are described below so as to explain the embodiments by referring to the figures. Repetitive description with respect to like elements of different embodiments may be omitted for the convenience of clarity. FIG. 1 exemplarily illustrates an image forming apparatus 1 according to an exemplary embodiment.

As shown in FIG. 1, an image forming apparatus 1 includes an image forming apparatus main body 10 receiving an electric power from an external power supply 3 to operate, and an electric power cable 20 connecting the external power supply 3 and the image forming apparatus main body 10 and transmitting an alternating current electric power supplied from the external power supply 3 to the image forming apparatus main body 10.

The image forming apparatus main body 10 includes a cable connecting unit 19, an outer side of which is connected to an end part of the electric power cable 20 to receive an alternating current electric power.

Figure 2:
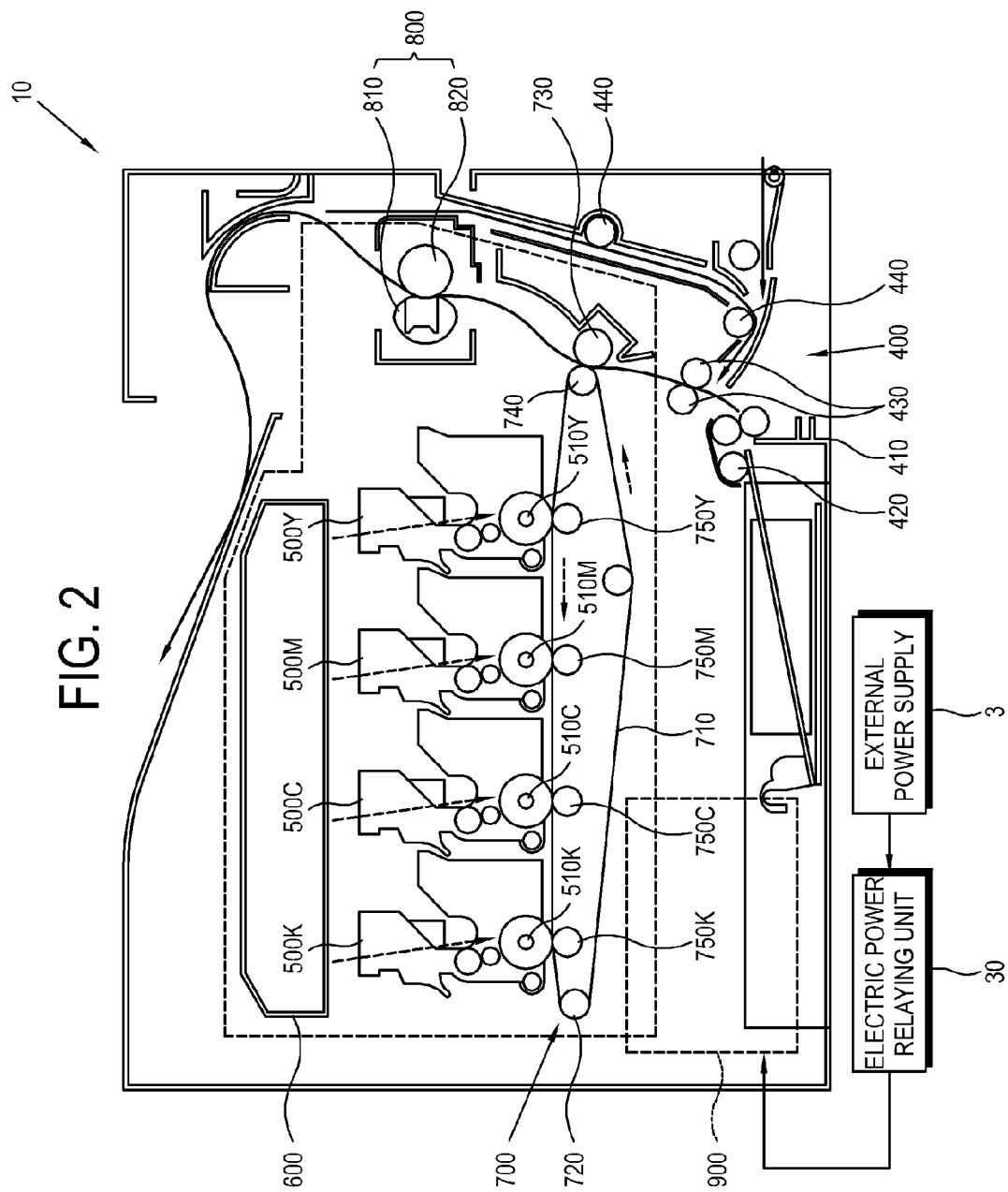
FIG. 2 is a side sectional view illustrating a configuration of an image forming apparatus main body of the image forming apparatus in FIG. 1.

Hereinafter, an operation of the image forming apparatus main body 10 will be described by referring to FIG. 2. FIG. 2 is a side sectional view illustrating a configuration of the image forming apparatus main body 10.

As shown in FIG. 2, the image forming apparatus main body 10 includes a medium supplying unit 400 supplying a loaded printing medium, an image forming cartridge 500K, 500C, 500M and 500Y having an image carrying body 510K, 510C, 510M and 510Y forming a visible image by a developer of each color, an exposing unit 600 corresponding to an image data to expose the image carrying body 510K, 510C, 510M and 510Y, a transferring unit 700 transferring a visible image formed on the image carrying body 510K, 510C, 510M and 510Y to a printing medium depending on a middle transferring method, a fusing unit 800 fusing an image on a printing medium, and an electric power supplying unit 900 supplying an electric power to these elements.

The medium supplying unit 400 includes a loading cassette 410 on which a printing medium is loaded, and a pickup roller 420 picking up a printing medium loaded on the loading cassette 410 to supply one by one. The picked up printing medium is transported to a registration roller 430.

The registration roller 430 aligns a front end of a transported printing medium, and transports the printing medium to the transferring unit 700 at a predetermined timing. The printing medium passes through the transferring unit 700 and the fusing unit 800, and an image is formed on a surface thereof.

A duplex roller 440 reversely transports a printing medium, a surface of which is formed with an image to the registration roller 430. The printing medium reversely transported by the duplex roller 440 is transported to the transferring unit 700 at an appropriate timing by the registration roller 430 again so that an image can be formed on the other surface thereof on which an image is not formed.

The image forming cartridge 500K, 500C, 500M and 500Y is configured to correspond to a plurality of colors. For example, the image forming cartridge 500K, 500C, 500M and 500Y is provided to correspond to a developer of black, cyan, magenta and yellow, and supplies the developer of each color to the image carrying body 510K, 510C, 510M and 510Y.

The image carrying body 510K, 510C, 510M and 510Y is exposed by the exposing unit 600 so that an electrostatic latent image is formed on a surface thereof, and the image forming cartridge 500K, 500C, 500M and 500Y supplies a developer to the electrostatic latent image so that a visible image can be formed on the image carrying body 510K, 510C, 510M and 510Y.

The transferring unit 700 transfers a visible image of the image carrying body 510K, 510C, 510M and 510Y on a printing medium with a middle transferring type. For this, the transferring unit 700 includes a middle transferring belt 710 moving by a caterpillar type with contacting to the image carrying body 510K, 510C, 510M and 510Y so that a visible image can be transferred and overlapped thereon, a driving roller 720 rotating the middle transferring belt 710, a final transferring roller 730 transferring a visible image on the middle transferring belt 710 to a printing medium, and a transferring backup roller 740 backing up the final transferring roller 730.

Also, the transferring unit 700 includes a transferring roller 750K, 750C, 750M and 750Y disposed to correspond to the image carrying body 510K, 510C, 510M and 510Y to interpose the middle transferring belt 710 therebetween. The transferring roller 750K, 750C, 750M and 750Y faces each image carrying body 510K, 510C, 510M and 510Y, and transfers a visible image on the image carrying body 510K, 510C, 510M and 510Y to the middle transferring belt 710.

The fusing unit 800 includes a heating roller 810 generating and emitting a heat, and a pressing roller 820 pressing the heating roller 810 to form a nip. A printing medium to which a visible image is transferred by the transferring unit 700 passes through the nip between the heating roller 810 and the pressing roller 820, and the visible image on the printing medium is fused by the heat and the pressure.

The electric power supplying unit 900 converts an alternating current electric power supplied from the external power supply 3 into a direct current electric power, and adjusts to an appropriate voltage level corresponding to each element to output to each element.

Here, since the image forming apparatus main body 10 directly receives an alternating current electric power through the electric power cable 20, an alternating current electric power of an abnormal electric power pattern which fails to be considered in a design manufacturing process of the image forming apparatus main body 10 may be transmitted to the image forming apparatus main body 10. In this case, the image forming apparatus main body 10 is apt to be out of order or a fire is apt to be caused.

For example, the heating roller 810 of the fusing unit 800 generates a high heat for fusing. If an abnormal electric power is supplied to the image forming apparatus main body 10, the amount of a heat generated in the heating roller 810 is apt to increase up as to damage the image forming apparatus main body 10. To prevent this, a fuse (not shown) is disposed in the image forming apparatus main body 10. However, if an electric power having a failure electric power property failing to be considered in a manufacturing process is input to the image forming apparatus main body 10, the fuse fails to be short-circuited and the image forming apparatus main body 10 may be ignited due to an overheat of the heating roller 810.

Accordingly, the image forming apparatus 1 includes an electric power relaying unit 30 selectively transmitting an alternating current electric power from the external power supply 3 to the image forming apparatus main body 10. If an alternating current electric power corresponds to an abnormal electric power pattern determined to correspond to an operating environment of the image forming apparatus main body 10, the electric power relaying unit 30 blocks the alternating current electric power to be transmitted to the image forming apparatus main body 10.

Accordingly, although the image forming apparatus main body 10 is not recalled and repaired, the image forming apparatus main body 10 can be protected to correspond to an abnormal electric power pattern considered after the manufacturing process.

Here, the electric power relaying unit 30 has a configuration corresponding to existing plug and outlet to contact and electrically connect to the existing electric power cable 20 and the cable connecting unit 19.

Figure 3:
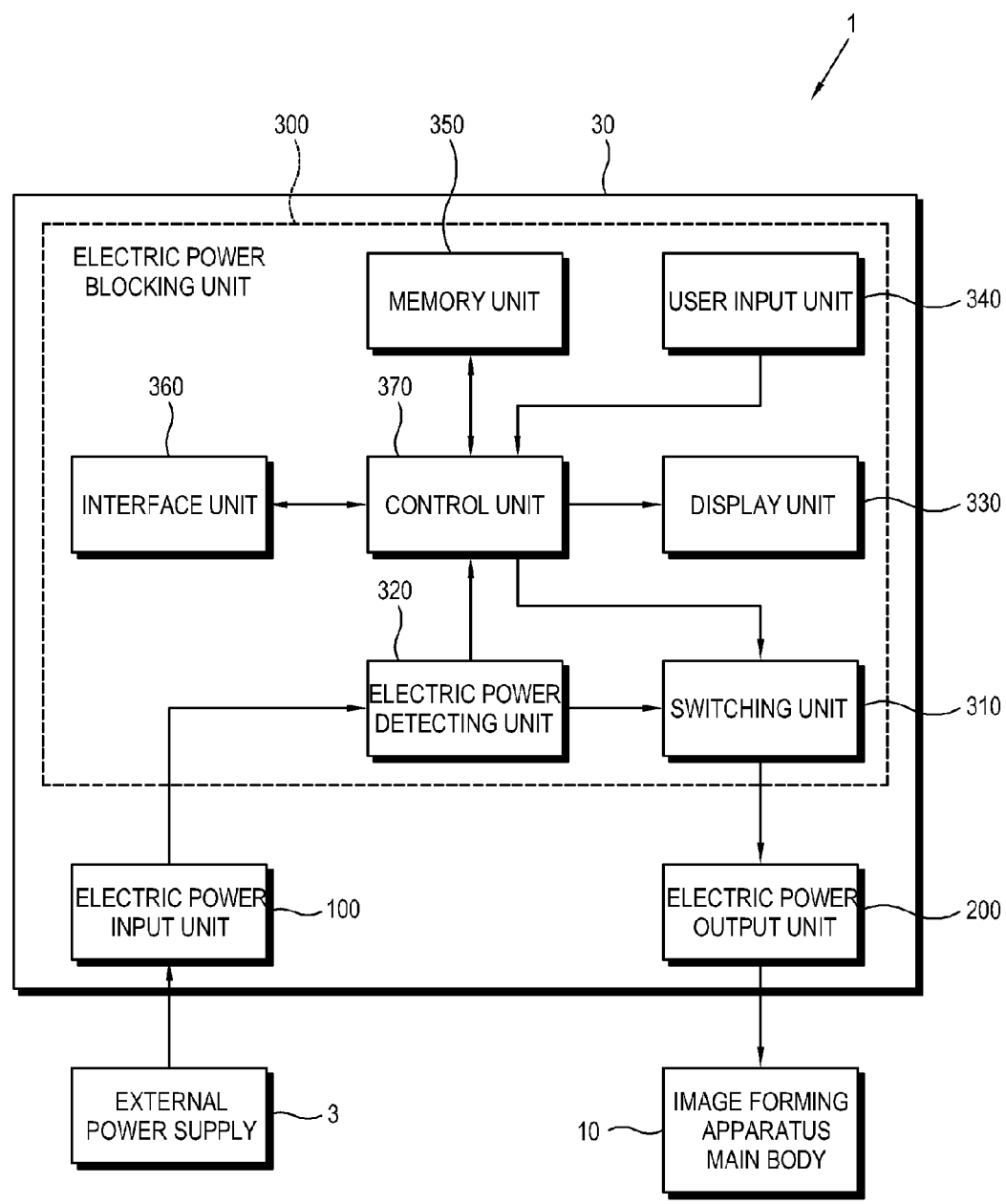
FIG. 3 is a block diagram illustrating an electric power transmitting and controlling configuration of an electric power relaying unit in the image forming apparatus in FIG. 1.

Hereinafter, a configuration of the electric power relaying unit 30 according to the present exemplary embodiment will be described by referring to FIG. 3. FIG. 3 is a block diagram illustrating an electric power transmitting and controlling configuration of the electric power relaying unit 30.

As shown in FIG. 3, the electric power relaying unit 30 includes an electric power input unit 100 to which an alternating current electric power is input from the external power supply 3, an electric power output unit 200 outputting an alternating current electric power input to the electric power input unit 100 to the image forming apparatus main body 10, and an electric power blocking unit 300 blocking an alternating current electric power to be transmitted to the electric power output unit 200 if an alternating current electric power pattern input to the electric power input unit 100 is determined to be an abnormal electric power pattern.

The electric power input unit 100 is connected to the electric power cable 20 connected to the external power supply 3, or is directly connected to the external power supply 3 to receive an alternating current electric power to output to the electric power output unit 200. The electric power input unit 100 may include at least one of an outlet configuration for enabling an end part of the electric power cable 20 to be connected thereto, and a plug configuration for being connected to the external power supply 3.

The electric power output unit 200 outputs an alternating current electric power output from the electric power input unit 100 to the image forming apparatus main body 10. Like the case of the electric power input unit 100, the electric power output unit 200 may have a configuration to which the electric power cable 20 connected to the image forming apparatus main body 10 is connected, or a configuration allowing to be directly connected to the cable connecting unit 19 of the image forming apparatus main body 10.

The electric power blocking unit 300 includes a switching unit 310 switching an alternating current electric power output from the electric power input unit 100 to be input to the electric power output unit 200, an electric power detecting unit 320 detecting an electric power pattern of an alternating current electric power output from the electric power input unit 100, a memory unit 350 in which a profile of a predetermined electric power pattern is stored, and a control unit 370 comparing an electric power pattern detected in the electric power detecting unit 320 with an electric power pattern profile of the memory unit 350 to determine whether to be an abnormal electric power or not and controlling the switching unit 310 depending on this determining result.

Also, the electric power blocking unit 300 may further include a display unit 330 displaying a control operation of the control unit 370, a user input unit 340 manipulated by a user and transmitting a predetermined command to the control unit 370, and an interface unit 360 provided to be accessible to the memory unit 350 or the control unit 370 from an outside.

The switching unit 310 is disposed on an electric power path between the electric power input unit 100 and the electric power output unit 200, and selectively allows or blocks an output of an alternating current electric power. The configuration of the switching unit 310 for this is not defined, and may be embodied by a relay or a switching semiconductor such as a triode for alternating current (TRIAC). The TRIAC means a kind of a two direction and three terminal thyrister capable of controlling an average current.

The electric power detecting unit 320 is disposed on an electric power path between the electric power input unit 100 and the switching unit 310. The electric power detecting unit 320 detects various electric power information, such as a current or a voltage of an alternating current electric power, to transmit to the control unit 370. In general, since an alternating current electric power output from the external power supply 3 is a high voltage of 110V or 220V, the electric power detecting unit 320 decreases the voltage of the alternating current electric power so that the control unit 370 can be prevented from being damaged. Also, the electric power detecting unit 320 may convert the alternating current electric power into a direct current electric power having a voltage decreased to a predetermined level to transmit to the control unit 370.

The electric power detecting unit 320 may be embodied by various types depending on a design type, and may employ a potential transformer (PT), a current transformer (CT), a shunt, etc. The potential transformer converts a high voltage to a low voltage which is proportional thereto, and is connected in parallel with a circuit to be used. The current transformer lowers a high current to a low current which is proportional thereto, and is connected in series with a circuited to be used. The shunt is a stationary resistor connected in series with a circuit, and has a high precision in comparison to the current transformer.

The display unit 330 displays a current operating state of the electric power relaying unit 30, for example, the case that an alternating current electric power output is blocked by an abnormal electric power detecting, to inform a user. The display unit 330 may be embodied by a liquid crystal display, a light emitting diode (LED), a speaker, a buzzer, etc. Also, the display unit 330 may display a manipulating state of the user input unit 340.

The user input unit 340 is manipulated by a user to transmit a command controlling the switching unit 310 to the control unit 370. For example, the user input unit 340 may transmit a command blocking or allowing an output of an alternating current electric power through the switching unit 310 to the control unit 370. Also, when updating an electric power pattern profile of the memory unit 350 through the interface unit 360, a user may control this updating process through the user input unit 340.

The memory unit 350 is embodied by a non volatile memory such as a flash memory to prevent a stored data from disappearing although an electric power is blocked. The memory unit 350 stores a profile of an abnormal electric power pattern corresponding to an operating environment of the image forming apparatus main body 10. That is, various profiles of abnormal electric power patterns which fail to be taken into account at a time manufacturing the image forming apparatus main body 10 are stored in the memory unit 350, and these profiles are differently designated depending on the kind, a manufacturer, a model name, etc. of the image forming apparatus main body 10.

A profile of an electric power pattern stored in the memory unit 350 may be embodied by various information such as a current value, a voltage value, a current wave pattern, etc., and may be not defined thereto.

The interface unit 360 is disposed so that the control unit 370 can communicate with an outside, or so that a data stored in the memory unit 350 can be accessible. That is, the interface unit 360 allows updating such as deleting, correcting, adding, etc. of an electric power pattern profile already stored in the memory unit 350 to be performed.

The interface unit 360 is connected with an external computer (not shown) by a local or a network to allow this updating to be performed. Also, the interface unit 360 allows a universal serial bus (USB) memory in which an electric power pattern profile for updating is stored to be connected, and allows an updating code determined in the control unit 370 to be executed so that an updating can be automatically performed.

The control unit 370 compares an electric power pattern detected from the electric power detecting unit 320 with an electric power pattern profile stored in the memory unit 350, and determines whether an alternating current electric power transmitted to the electric power output unit 200 from the electric power input unit 100 corresponds to an abnormal electric power pattern or not from this comparing result.

If the control unit 370 determines that the alternating current electric power does not correspond to an abnormal electric power pattern and is normal, the control unit 370 allows an electric power output through the switching unit 310. Accordingly, the alternating current electric power output from the external electric power 3 can be supplied to the image forming apparatus main body 10 through the electric power output unit 200.

On the other hand, if the control unit 370 determines that the alternating current electric power corresponds to an abnormal electric power pattern, the control unit 370 controls a switching operation of the switching unit 310 to block an electric power output through the switching unit 310. Accordingly, supplying of the alternating current electric power through the electric power output unit 200 is blocked, and the image forming apparatus main body 10 is prevented from being supplied with an electric power. That is, if an alternating current electric power shows an abnormal electric power pattern which becomes the cause of failure of the image forming apparatus main body 10, the corresponding alternating current electric power can be prevented from being transmitted to the image forming apparatus main body 10, thereby preventing a failure or a fire of the image forming apparatus main body 10.

The control unit 370 displays this control result of the switching unit 310 through the display unit 330 to inform a user.

The control unit 370 may be embodied by a complex programmable logic device (CPLD), a field programmable gate array (FPGA), a group of integrated circuits (IC), etc., or may be embodied by a mixture thereof. Depending on a designing type, an integrated configuration of the control unit 370 and the memory unit 350 can be possible.

Hereinafter, a using exemplary embodiment of the electric power relaying unit 30 according to the present exemplary embodiment will be described. Here, that the image forming apparatus main body 10 directly receives an alternating current electric power from the external power supply 3 through the electric power cable 20 is assumed as an initial state.

If an abnormal electric power pattern which is the cause of a failure of the image forming apparatus main body 10 is reported from a user, a laboratory, etc. after manufacturing and releasing of the image forming apparatus main body 10, a manufacture confirms through an experiment whether the image forming apparatus main body 10 of the same model as the image forming apparatus currently released is capable of being protected to correspond to the reported abnormal electric power pattern.

If the configuration of the present image forming apparatus main body 10 is confirmed to fail to correspond to the abnormal electric power pattern, the manufacturer sends to a user the electric power relaying unit 30 having the memory unit 350 in which a profile of the corresponding abnormal electric power pattern is reported.

The user disposes the sent electric power relaying unit 30 to a supplying terminal of an alternating current electric power with respect to the image forming apparatus main body 10.

An alternating current electric power output from the external power supply 3 is transmitted to the image forming apparatus main body 10 through the electric power input unit 100, the electric power detecting unit 320, the switching unit 310 and the electric power output unit 200. The electric power detecting unit 320 transmits an electric power information of the alternating current electric power to the control unit 370, and the control unit 370 compares the transmitted electric power information with an electric power pattern profile of the memory unit 350.

If the control unit 370 determines that there is no abnormality in the comparison result, the control unit 370 maintains the switching unit 310 to allow an electric power output. If the control unit 370 determines that the alternating current electric power shows an abnormal electric power pattern in the comparison result, the control unit 370 controls the switching unit 310 to block an electric power output to prevent an abnormal electric power from being supplied to the image forming apparatus main body 10. Accordingly, the image forming apparatus main body 10 can be protected from an abnormal electric power. Also, the control unit 370 displays the electric power blocking result in the display unit 330 so that a user can respond thereto.

Under the state that the electric power relaying unit 30 is disposed to the image forming apparatus 1, a new abnormal electric power pattern may be reported again. Then, a user connects the interface unit 360 to a server (not shown) operated by a manufacturer by a network so that a profile of a new abnormal electric power pattern can be updated in the memory unit 350.

Also, the user downloads an updating application or an electric power profile for updating through a computer (not shown) connected to the server by a network. Then, the user may connect the computer to the interface unit 360 by a local, and then may perform an updating of the memory unit 350 through the computer.

Like this, according to the present exemplary embodiment, whether an alternating current electric power is an abnormal electric power or not is determined based on an electric power pattern profile predetermined in the memory unit 350, and an output of the alternating current electric power is blocked depending on the determining result, thereby protecting the image forming apparatus main body 10. Also, without collecting the image forming apparatus main body 10 from a user, the image forming apparatus main body 10 can be protected to correspond to an abnormal electric power pattern which is considered after releasing of the image forming apparatus main body 10.

Figure 4:
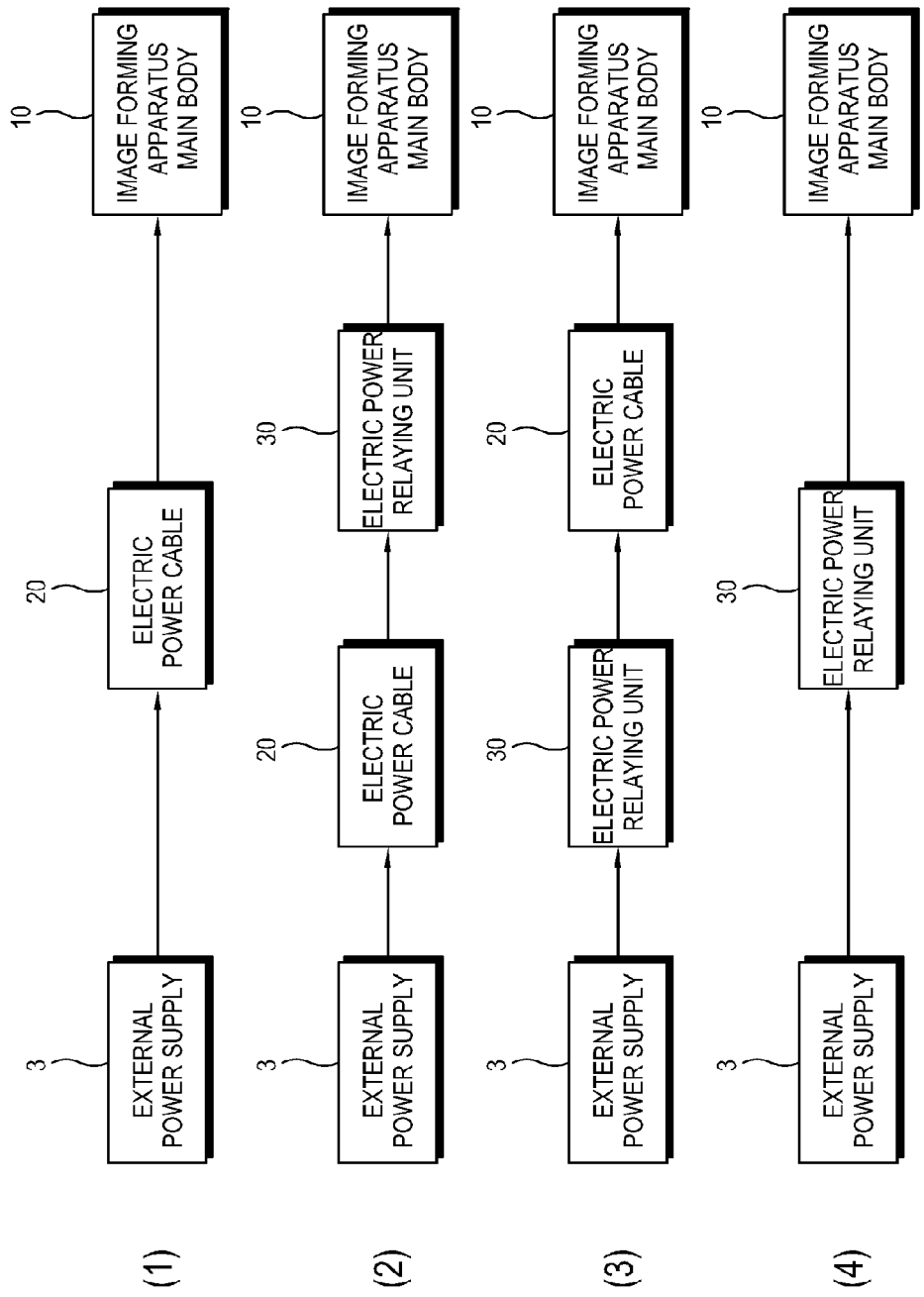
FIG. 4 is a block diagram illustrating a disposition of the electric power relaying unit when the electric power relaying unit is applied to the image forming apparatus in FIG. 1.

Hereinafter, a position of disposing the electric power relaying unit 30 will be described by referring to FIG. 4. FIG. 4 is a block diagram illustrating a disposing type of the electric power relaying unit 30 when the electric power relaying unit 30 is applied to the image forming apparatus 1, and an arrow in the drawing refers to a transmission of an alternating current electric power.

(1) of FIG. 4 illustrates the state that the electric power relaying unit 30 is not applied, and the electric power cable 20 is connected between the external power supply 3 and the image forming apparatus main body 10 to transmit an alternating current electric power of the external power supply 3 to the image forming apparatus main body 10. In this case, it is difficult to correspond to an abnormal electric power failing to be considered in manufacturing of the image forming apparatus main body 10 to protect the image forming apparatus main body 10. Accordingly, the present exemplary embodiment may employ the electric power relaying unit 30 as follows.

(2) of FIG. 4 illustrates the state that the electric power relaying unit 30 is connected between the electric power cable 20 and the image forming apparatus main body 10. In this case, the electric power relaying unit 30 may have an outlet of the same standard as the cable connecting unit 19 of the image forming apparatus main body 10.

(3) of FIG. 4 illustrates the state that the electric power relaying unit 30 is connected between the external power supply 3 and the electric power cable 20. In this case, the electric power relaying unit 30 may include a plug for directly connecting to the external power supply 3, and an outlet to which the electric power cable 20 is connected.

(4) of FIG. 4 illustrates the state that the electric power relaying unit 30 is directly connected between the external power supply 3 and the image forming apparatus main body 10 without the electric power cable 20. That is, the electric power relaying unit 30 is connected to the external power supply 3 and the cable connecting unit 19 instead of the electric power cable 20.

Like this, the electric power relaying unit 30 may be disposed to any position as long as to block an alternating current electric power supplied to the image forming apparatus main body 10 from the external power supply 3.

In the above exemplary embodiment, the electric power relaying unit 30 is exemplarily illustrated to be disposed to correspond to the single image forming apparatus main body 10, but the present embodiments are not defined thereto. For example, the configuration of an electric power relaying unit 31 corresponding to at least two image forming apparatus main bodies 11 and 12 is possible, and this configuration will be described as a second exemplary embodiment by referring to FIG. 5.

Figure 5:
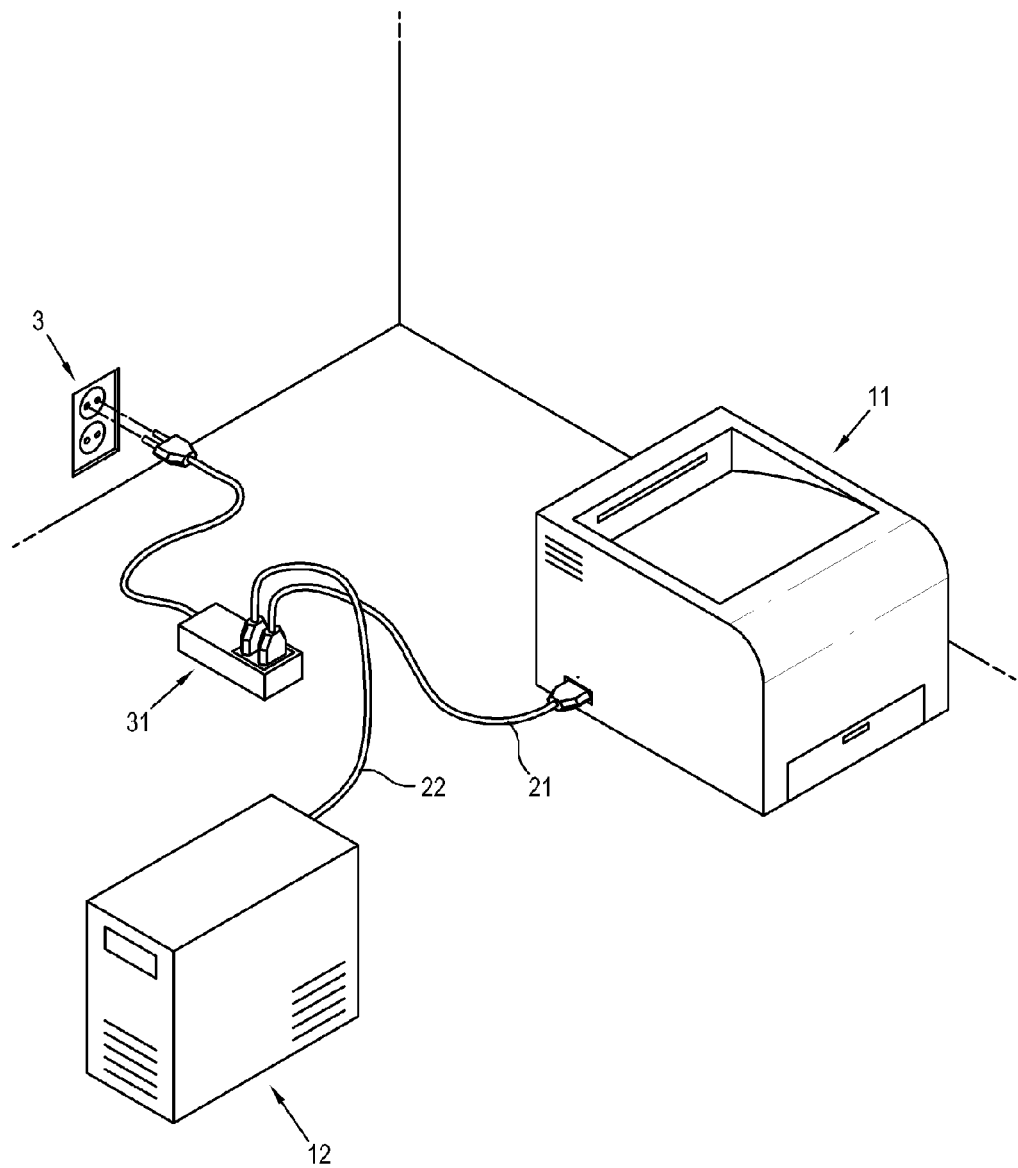
FIG. 5 exemplarily illustrates an image forming apparatus according to an exemplary embodiment.

FIG. 5 exemplarily illustrates an image forming apparatus 1 according to an exemplary embodiment.

As shown in FIG. 5, according to the exemplary embodiment, the two image forming apparatus main bodies 11 and 12 are provided unlike the first exemplary embodiment. The electric power relaying unit 31 is connected to the external power supply 3 to receive an alternating current electric power, and a first electric power cable 21 and a second electric power cable 22 respectively connected to the first image forming apparatus main body 11 and the second image forming apparatus main body 12 are connected to the electric power relaying unit 31. That is, in the exemplary embodiment, an alternating current electric power output from the external power supply 3 diverges to be respectively supplied to the first image forming apparatus main body 11 and the second image forming apparatus main body 12.

Figure 6:
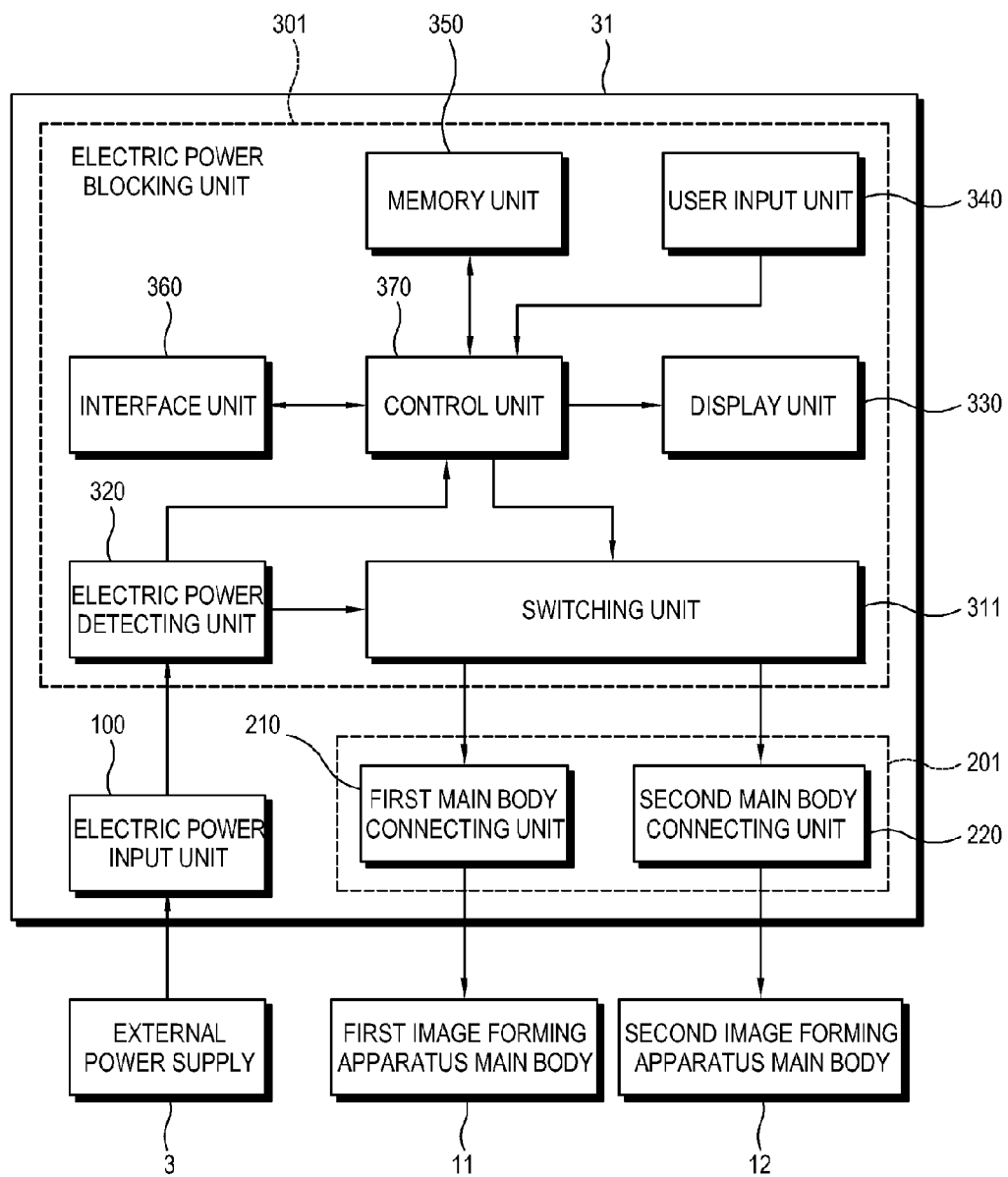
FIG. 6 is a block diagram illustrating an electric power transmitting and controlling configuration of an electric power relaying unit in the image forming apparatus in FIG. 5.

Hereinafter, the electric power relaying unit 31 according to the present exemplary embodiment will be described by referring to FIG. 6. FIG. 6 is a block diagram illustrating the electric power relaying unit 31 according to the present exemplary embodiment.

As shown in FIG. 6, to protect the first image forming apparatus main body 11 and the second image forming apparatus main body 12 to correspond to the same abnormal electric power pattern, the electric power relaying unit 30 may be separately disposed to each of the first image forming apparatus main body 11 and the second image forming apparatus main body 12. However, in this case, it is convenient to protect all of the first image forming apparatus main body 11 and the second image forming apparatus main body 12 by the single electric power relaying unit 31.

For this, the electric power relaying unit 31 includes an electric power input unit 100, an electric power output unit 201 and an electric power blocking unit 301. Also, the electric power blocking unit 301 includes a switching unit 311, an electric power detecting unit 330, a display unit 330, a user input unit 340, a memory unit 350, an interface unit 360 and a control unit 370. In the present exemplary embodiment, the configuration performing the same function as the first exemplary embodiment may apply the same configuration as the first exemplary embodiment.

The power output unit 201 includes a first main body connecting unit 210 to which the first electric power cable 21 is connected, and a second main body connecting unit 220 to which the second electric power cable 22 is connected. Accordingly, the electric power output unit 201 can respectively output an alternating current electric power with respect to the first image forming apparatus main body 11 and the second image forming apparatus main body 12.

The switching unit 311 respectively outputs an alternating current electric power output from the electric power input unit 100 to the first main body connecting unit 210 and the second main body connecting unit 220. If the switching unit 311 is controlled by the control unit 370 to block an electric power output, all alternating current electric power output to the first main body connecting unit 210 and the second main body connecting unit 220 can be blocked.

With this configuration, a user connects the electric power relaying unit 31 to the external power supply 3, and respectively connects the electric power relaying unit 31 to the first image forming apparatus main body 11 and the second image forming apparatus main body 12. In the memory unit 350 of the electric power relaying unit 31, a profile of an abnormal electric power pattern corresponding to all of the first image forming apparatus main body 11 and the second image forming apparatus main body 12 is stored.

The exemplary embodiment may be applied to the configuration of the control unit 370 determining whether an alternating current electric power is an abnormal electric power or not.

If an alternating current electric power pattern corresponds to an abnormal electric power pattern, this alternating current electric power may be the cause of a failure of the first image forming apparatus main body 11 and the second image forming apparatus main body 12. Accordingly, the control unit 370 controls the switching unit 311 to block an output of the alternating current electric power with respect to the first main body connecting unit 210 and the second main body connecting unit 220. Accordingly, all of the first image forming apparatus main body 11 and the second image forming apparatus main body 12 can be protected from the abnormal electric power.

In the exemplary embodiment, the first image forming apparatus main body 11 and the second image forming apparatus main body 12 are illustrated to be protected together to correspond to the same abnormal electric power pattern. However, abnormal electric power patterns respectively corresponding to the first image forming apparatus main body 11 and the second image forming apparatus main body 12 may be different from each other.

Figure 7:
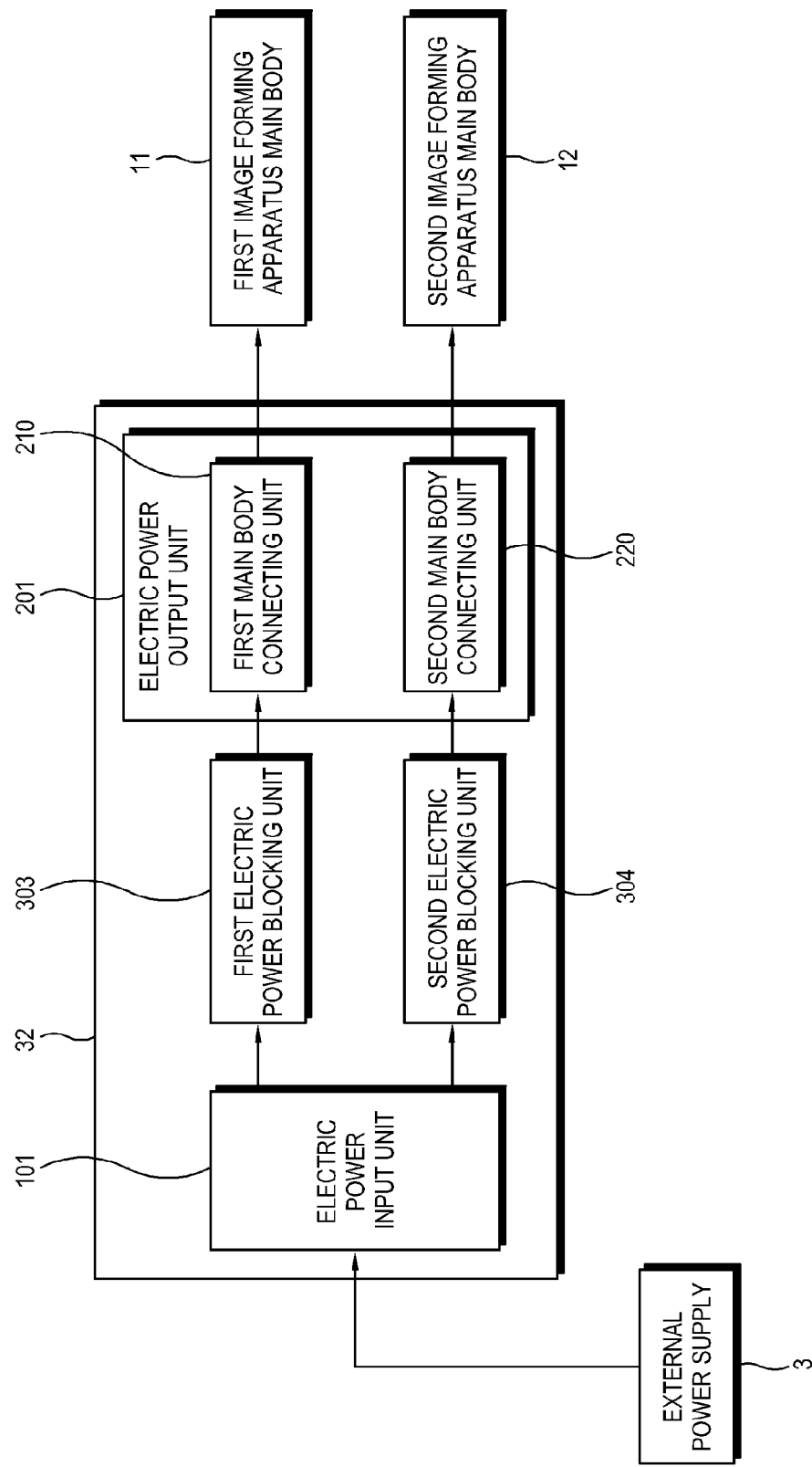
FIG. 7 is a block diagram illustrating an electric power transmitting and controlling configuration of an electric power relaying unit according to an exemplary embodiment.

The configuration with respect to this case is an exemplary embodiment, which will be described by referring to FIG. 7. FIG. 7 is a block diagram illustrating an electric power relaying unit 32 according to the exemplary embodiment.

As shown in FIG. 7, the electric power relaying unit 32 according to the exemplary embodiment includes an electric power input unit 101 receiving an alternating current electric power from an external power supply 3, an electric power output unit 201 respectively outputting an alternating current electric power diverging and output from the electric power input unit 101 to a first image forming apparatus main body 11 and a second image forming apparatus main body 12, and a first electric power blocking unit 303 and a second electric power blocking unit 304 disposed to block each alternating current electric power diverging and output from the electric power input unit 101.

The electric power input unit 101 diverges and outputs an alternating current electric power from the external power supply 3 in a plurality of lines, in the present exemplary embodiment, in two lines. Each alternating current electric power diverging and output is output to a first main body connecting unit 210 and a second main body connecting unit 220 of the electric power output unit 201.

The first main body connecting unit 210 and the second main body connecting unit 220 are respectively connected to the first image forming apparatus main body 11 and the second image forming apparatus main body 12 to respectively supply an alternating current electric power output from the electric power input unit 101 to the first image forming apparatus main body 11 and the second image forming apparatus main body 12.

The first electric power blocking unit 303 and the second electric power blocking unit 304 respectively block an alternating current electric power output to the first main body connecting unit 210 from the electric power input unit 101, and an alternating current electric power output to the second main body connecting unit 220 from the electric power input unit 101. The detailed configurations of the first electric power blocking unit 303 and the second electric power blocking unit 304 may apply the electric power blocking unit 300 according to the first exemplary embodiment.

The first electric power blocking unit 303 stores a profile related to an abnormal electric power pattern corresponding to an operating environment of the first image forming apparatus main body 11. On the other hand, the second electric power blocking unit 304 stores a profile related to an abnormal electric power pattern corresponding to an operating environment of the second image forming apparatus main body 12. Since the operating environments of the first image forming apparatus main body 11 and the second image forming apparatus main body 12 are different, each profile has a different pattern property.

That is, an electric power pattern which an alternating current electric power shows corresponds to one of the case that it is no abnormal electric power in all of the first image forming apparatus main body 11 and the second image forming apparatus main body 12, the case that it is an abnormal electric power in all of the first image forming apparatus main body 11 and the second image forming apparatus main body 12, and the case that that it is an abnormal electric power in only one of the first image forming apparatus main body 11 and the second image forming apparatus main body 12.

The present exemplary embodiment is capable of corresponding to all three cases, and especially, to the third case by respectively regulating an alternating current electric power diverging and output from the electric power input unit 101.

Hereinafter, a method by which the electric power relaying unit 32 according to the present exemplary embodiment separately protects the first image forming apparatus main body 11 and the second image forming apparatus main body 12 against an abnormal electric power will be described.

A method of a user disposing the electric power relaying unit 32 may apply the exemplary embodiment.

An alternating current electric power having a predetermined electric power pattern is output from the electric power input unit 101 to be respectively input to the first electric power blocking unit 303 and the second electric power blocking unit 304.

The first electric power blocking unit 303 determines whether the alternating current electric power is an abnormal electric power or not based on a predetermined electric power pattern profile, and blocks an output of the alternating current electric power with respect to the first main body connecting unit 210 if determining to be an abnormal electric power.

Also, the second electric power blocking unit 304 determines whether the alternating current electric power is an abnormal electric power or not based on an electric power pattern profile predetermined to be different from the first electric power blocking unit 303. Here, the electric power pattern profiles which the first electric power blocking unit 303 and the second electric power blocking unit 304 refer to are different. Accordingly, the second electric power blocking unit 304 may determine the alternating current electric power determined to be an abnormal electric power by the first electric power blocking unit 303 not to be an abnormal electric power.

In this case, the second electric power blocking unit 304 allows an output of the alternating current electric power with respect to the second main body connecting unit 220.

Like this, if an electric power pattern of an alternating current electric power operates as an abnormal electric power with respect to only a part of a plurality of image forming apparatus main body 11 and 12, an alternating current electric power supplying with respect to the image forming apparatus main body 11 determining to be an abnormal electric power may be blocked, and an alternating current electric power supplying may be allowed with respect to the remaining image forming apparatus main body 12.

Figure 8:
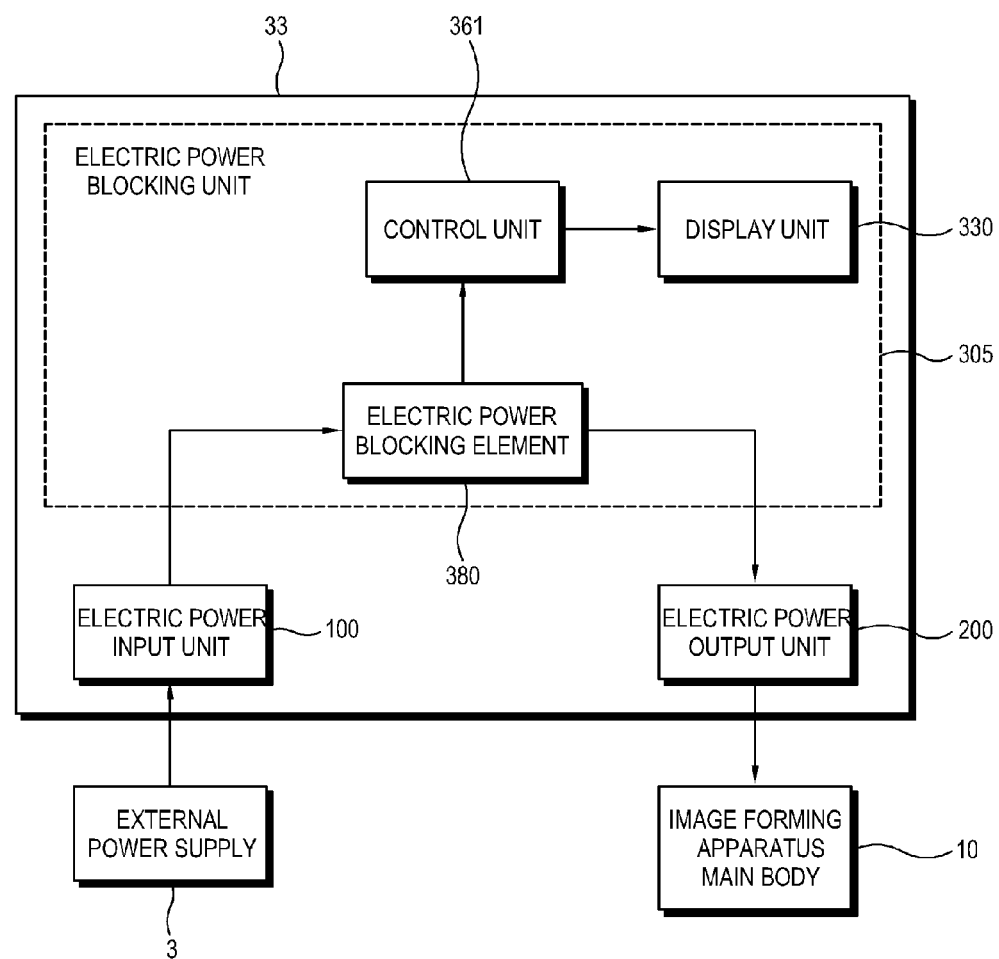
FIG. 8 is a block diagram illustrating an electric power transmitting and controlling configuration of an electric power relaying unit according to an exemplary embodiment.

The electric power blocking unit 305 may be embodied by a different configuration from the exemplary embodiments described above, and this is an exemplary embodiment, which will be described by referring to FIG. 8. FIG. 8 is a block diagram illustrating an electric power relaying unit 33 according to the exemplary embodiment.

As shown in FIG. 8, the electric power relaying unit 33 according to the present exemplary embodiment includes an electric power input unit 100 to which an alternating current electric power is input from an external power supply 3, an electric power output unit 200 outputting an alternating current electric power from the electric power input unit 100 to an image forming apparatus main body 10, and an electric power blocking unit 305 selectively blocking an output of an alternating current electric power with respect to the electric power output unit 200.

The electric power blocking unit 305 includes an electric power blocking element 380 disposed on an electric power path between the electric power input unit 100 and the electric power output unit 200 and blocking an electric power flow of the electric power path to correspond to an electric power property in a predetermined failure of the image forming apparatus main body 10, and a control unit 361 displaying in a display unit 330 that an electric power is blocked by the electric power blocking element 380.

If an alternating current electric power of an abnormal electric power pattern predetermined to correspond to the image forming apparatus main body 10 flows, the electric power blocking element 380 is short-circuited on its own to block the corresponding alternating current electric power to be transmitted to the electric power output unit 200. The electric power blocking element 380 employs a short-circuit property selected by a manufacturer to correspond to an operating environment of the image forming apparatus main body 10.

The configuration of the electric power blocking element 380 is not defined, and may be embodied by a fuse, a bimetal, etc.

With this configuration, if an alternating current electric power flowing in the electric power blocking element 380 is an abnormal electric power to correspond to a short-circuit property of the electric power blocking element 380, the electric power blocking element 380 is short-circuited to block the flow of the alternating current electric power. Accordingly, an abnormal electric power can be prevented from being supplied to the device main body 10.

In the above exemplary embodiment, the single image forming apparatus main body 10 is illustrated to be connected to the electric power output unit 200, but a plurality of image forming apparatus main bodies 11 and 12 may be connected thereto. This case is an exemplary embodiment, which will be described by referring to FIG. 9.

Figure 9:
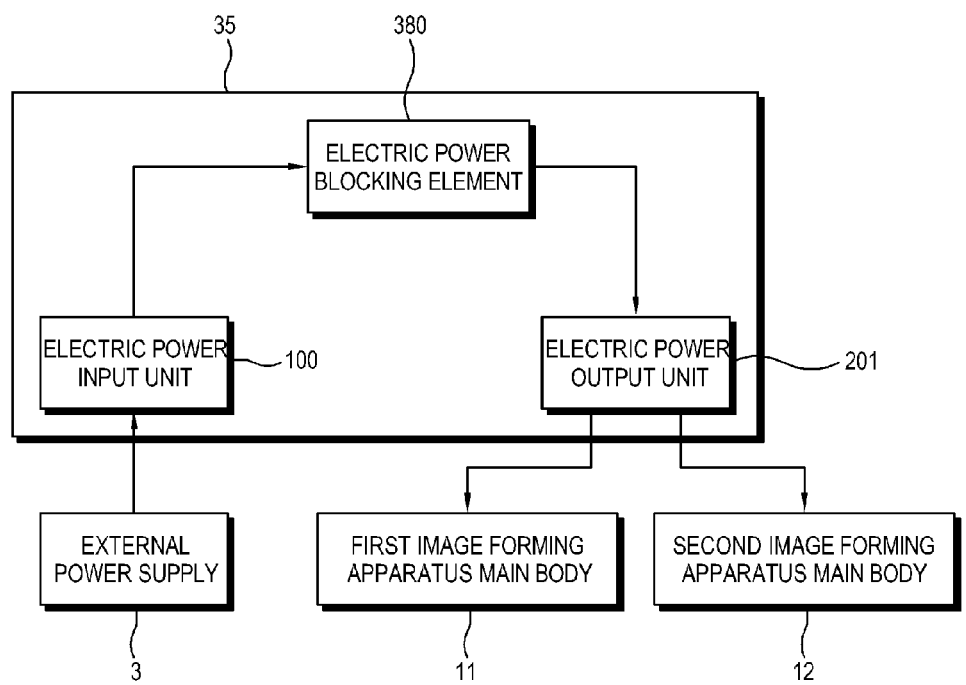
FIG. 9 is a block diagram illustrating an electric power transmitting and controlling configuration of an electric power relaying unit according to an exemplary embodiment.

FIG. 9 is a block diagram illustrating an electric power relaying unit 35 according to the exemplary embodiment.

As shown in FIG. 9, in the electric power relaying unit 35 according to the exemplary embodiment, a first image forming apparatus main body 11 and a second image forming apparatus main body 12 are respectively connected to an electric power output unit 201 so that an alternating current electric power can be respectively received. This configuration of the electric power output unit 201 may apply the case of FIG. 6 according to the exemplary embodiment.

An electric power blocking element 380 has a short-circuit property corresponding to all of a first image forming apparatus main body 11 and a second image forming apparatus main body 12. If an abnormal electric power flows, the electric power blocking element 380 is short-circuited to block an electric power output with respect to the electric power output unit 201.

Accordingly, the first image forming apparatus main body 11 and the second image forming apparatus main body 12 can be prevented from being supplied with an abnormal electric power.

Also, to be different from the fifth exemplary embodiment, a configuration separately performing an alternating current electric power blocking with respect to the first image forming apparatus main body 11 and the second image forming apparatus main body 12 is possible. This configuration is an exemplary embodiment, which will be described by referring to FIG. 10.

FIG. 10 is a block diagram illustrating an electric power relaying unit 36 according to the exemplary embodiment.

As shown in FIG. 10, the electric power relaying unit 36 includes an electric power input unit 101 to which an alternating current electric power is input from an external power supply 3, an electric power output unit 201 respectively outputting an alternating current electric power diverging and output from the electric power input unit 101 to a first image forming apparatus main body 11 and a second image forming apparatus main body 12, and a first electric power blocking element 381 and a second electric power blocking element 382 disposed to separately block an alternating current electric power diverging and output from the electric power input unit 101.

The first electric power blocking element 381 and the second electric power blocking element 382 have short-circuit properties separately corresponding to abnormal electric power patterns of the first image forming apparatus main body 11 and the second image forming apparatus main body 12.

For example, an alternating current electric power output from the electric power input unit 101 may not be an abnormal electric power with respect to the first image forming apparatus main body 11, but may be an abnormal electric power with respect to the second image forming apparatus main body 12. In this case, the first electric power blocking element 381 is not short-circuited and allows a flow of an alternating current electric power, but the second electric power blocking element 382 is short-circuited to block a flow of an alternating current electric power. Accordingly, the alternating current electric power is supplied to the first image forming apparatus main body 11, and the alternating current electric power is not supplied to the second image forming apparatus main body 12.

Like this, the single electric power relaying unit 35 and 36 can be applied and correspond to a plurality of image forming apparatus main bodies 11 and 12 having different abnormal electric power patterns.

In the present exemplary embodiment, the electric power relaying unit 30 is illustrated to be applied to the image forming apparatus 1, but the electric power relaying unit 30 may be applied to various apparatuses receiving an electric power from an outside to perform various functions, for example, a scanner, a multifunction device, an electronic copier, a television, a computer main body, home appliances such as a refrigerator, a washing machine, etc.

According to the embodiments, by applying an electric power relaying unit blocking an electric power output to an image forming apparatus to correspond to an abnormal electric power pattern failing to be anticipated in a manufacturing process of the image forming apparatus, the image forming apparatus can be safely protected from a failure electric power.

Also, since it is sufficient to just add an electric power relaying unit without repairing an image forming apparatus, it is unnecessary for a manufacturer to collect the image forming apparatus, and a user is capable of easily responding thereto if a problem happens. Accordingly, enormous human and material costs caused in the conventional recall can be drastically reduced.

Also, since an electric power pattern profile corresponding to an operating environment of an image forming apparatus is stored in a memory unit, an abnormal electric power pattern corresponding to the image forming apparatus can be easily discerned.

Also, by applying an interface unit accessible to a memory unit from an outside, an electric power pattern profile stored in the memory unit can be updated. Accordingly, the present invention can correspond to a new abnormal electric power pattern which may happen later, and can flexibly correspond to and be applied to an image forming apparatus embodied by various types.

Also, by applying a display unit displaying an electric power blocking when an electric power is blocked by a switching unit, the electric power blocking can be informed to a user so that the user can deal therewith appropriately.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An electric power relaying unit of an electronic device comprising:
   an input unit which is connected to an external power supply so as to receive electric power from the external power supply;
   an output unit which is connected to the electronic device so as to output the electric power to the electronic device;
   a switch which selectively prevents flow of the electric power to the output unit;
   a detector which detects an electric power property of the electric power;
   a memory which stores a profile of a predetermined electric power pattern;
   a controller which controls the switch to prevent the flow of the electric power to the output unit when the detector detects a profile which is different from the profile to be stored in the memory; and
   a notice unit which notifies that the flow of the electric power to the output unit is prevented.

2. The electric power relaying unit of the electronic device according to claim 1, wherein, if the profile of the electric power detected by the detector does not correspond to the profile stored in the memory, the controller determines that the electric power corresponds to an electric power property in a failure of the electronic device.

3. The electric power relaying unit of the electronic device according to claim 1, further comprising an interface configured to communicate with an outside.

4. The electric power relaying unit of the electronic device according to claim 3, wherein the interface comprises at least one of a memory port to which an external memory is mounted, a first communication port for a local communication, and a second communication port for a network communication.

5. The electric power relaying unit of the electronic device according to claim 1, the notice unit comprises a display which displays that the electric power to the output unit is blocked by the switch.

6. The electric power relaying unit of the electronic device according to claim 1, wherein the output unit is provided to allow a plurality of the electronic devices to be connected thereto so that the plurality of the electronic devices can respectively receive the electric power.

7. The electric power relaying unit of the electronic device according to claim 6, wherein the electric power output from the switch diverges to respectively correspond to the plurality of the electronic devices.

8. The electric power relaying unit of the electronic device according to claim 6, wherein a plurality of the switches are disposed correspondingly to each electric power diverging to respectively corresponding to the plurality of the electronic devices from the input unit.

9. The electric power relaying unit of the electronic device according to claim 1, further comprising a user input unit, wherein the switch switches the electric power to correspond to an input command of the user input unit.

10. The electric power relaying unit of the electronic device according to claim 1, further comprising a user input unit, wherein if a time is input by the user input unit, the controller controls a switching operation of the switch to correspond to an elapse of the time input by the user input unit.

11. A system, comprising:
an electronic device; and
an electric power relaying unit which transmits electric power from an external power supply to the electronic device,
the electric power relaying unit comprising
an input unit which is connected to the external power supply so as to receive the electric power from the external power supply;
an output unit which is connected to the electronic device so as to output the electric power to the electronic device;
a switch which selectively prevents flow of the electric power to the output unit;
a detector which detects an electric power property of the electric power;
a memory which stores a profile of a predetermined electric power pattern;
a controller which controls the switch to prevent the flow of the electric power to the output unit when the detector detects a profile which is different from the profile to be stored in the memory; and
a notice unit which notifies that the flow of the electric power to the output unit is prevented.

\* \* \* \* \*